United States Patent Office 3,259,281
Patented July 5, 1966

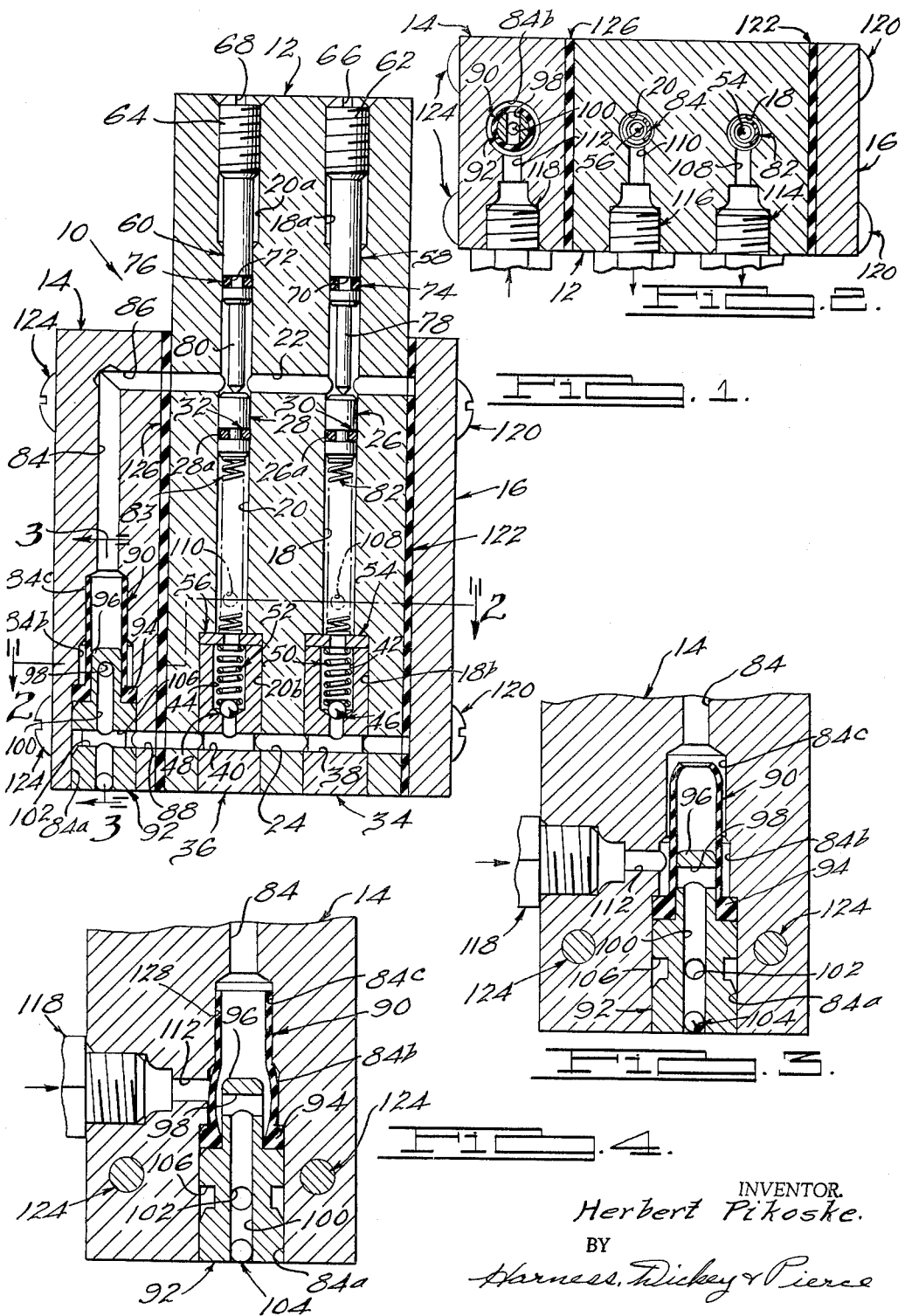

3,259,281
ADJUSTABLE METERING DEVICE
Herbert Pikoske, Racine, Wis., assignor to Walker Manufacturing Company, Racine, Wis., a corporation of Delaware
Filed Feb. 6, 1964, Ser. No. 343,031
8 Claims. (Cl. 222—335)

This invention relates generally to fluid pumping and metering means, and more particularly to an adjustable, positive displacement fluid metering device.

The metering device of the present invention is characterized by an extremely compact and simply designed unit which includes a fluid pumping manifold having a plurality of fluid pumping or metering chambers. Each of these chambers is provided with reciprocal piston means together with means for selectively controlling the pumping displacement of the piston means such that the quantity of fluid discharged or metered by each individual chamber may be varied or adjusted without affecting the quantity of fluid being discharged or metered by the remaining chambers.

It is an object of the present invention to provide a fluid metering device of the above character which finds particular application in metering lubricating fluids to antifriction bearings or the like.

It is another object of the present invention to provide a fluid metering device of an extremely compact construction.

It is another object of the present invention to provide a fluid metering device which is characterized by universality of adjustment and installation.

It is yet another object of the present invention to provide a fluid metering device of a simple design that can be easily assembled and economically manufactured.

Other objects and advantages of the present invention will become apparent from the following detailed description taken in conjunction with the accompanying drawings, wherein:

FIGURE 1 is a longitudinal cross-sectional view of an exemplary embodiment of the fluid metering device of the present invention in a static condition;

FIGURE 2 is a transverse cross-sectional view taken substantially along the line 2—2 of FIGURE 1;

FIGURE 3 is an enlarged fragmentary cross-sectional view taken along the line 3—3 of FIGURE 1, taken when the meter system is under pressure and the valve structure therein is in a collapsed position; and FIGURE 4 is a fragmentary cross-sectional view of the structure illustrated in FIGURE 3, taken when the valve structure therein is in an expanded position.

Referring now to FIGURE 1 of the drawing, a fluid metering device 10, in accordance with an exemplary embodiment of the present invention, includes a metering or manifold housing 12 to which are attached a valve housing 14 and an end closure plate 16. The housing 12 is formed with a pair of cylindrical fluid displacement bores or metering chambers 18 and 20 which are respectively provided with enlarged diameter upper and lower sections 18a, 18b and 20a, 20b. Also formed in the manifold housing 12 is a pair of transversely extending fluid passages 22 and 24 which communicate the chambers 18 and 20. Reciprocally or slidably mounted in the metering chambers 18 and 20 are cylindrical pistons 26 and 28 which are formed with reduced section medial sections 26a and 28a within which are disposed conventional packing or O-rings 30 and 32, respectively. A pair of end plugs 34 and 36 are press fitted within the lower chamber sections 18b and 20b, and are respectively formed with fluid passages 38 and 40 which are adapted to communicate with the fluid passage 24 upon assembly of the plugs 34 and 36 within the housing 12. The end plugs 34 and 36 are also formed with check valve bores 42 and 44 which are coaxial with the chambers 18 and 20, respectively, and which are in communication with the fluid passages 38 and 40, respectively. A pair of ball type check valves 46 and 48 are resiliently seated within the bores 42 and 44 by helical coil springs 50 and 52, respectively, which extend between the ball valves 46 and 48, and a pair of washers 54 and 56 that are secured within the chamber sections 18b and 20b by the plugs 34 and 36, respectively.

As illustrated in FIGURE 1, a pair of adjustment rods, generally designated 58 and 60, extend axially within the metering chambers 18 and 20, respectively. The adjustment rods 58 and 60 are respectively formed with enlarged diameter upper sections 62 and 64 which have screwdriver receiving slots 66 and 68, and which are threadably mounted within the upper chamber sections 18a and 20a. The rods 58 and 60 are further formed with annular recesses 70 and 72 within which are disposed packing or O-ring 74 and 76, respectively. Piston engaging stem sections 78 and 80 are formed on the inner ends of the rods 58 and 60 against which the pistons 26 and 28 are resiliently urged by coil springs 82 and 83 that extend longitudinally within the metering chambers 18 and 20 between the pistons 26, 28 and the washers 54, 56.

From the structure thus described, it will be seen that the length of the stroke and thus the displacement of one of the pistons 26 or 28 may be varied entirely independently of the other of said pistons by merely adjusting the axial position of the appropriate adjustment rod 58 or 60 within the metering chamber 18 and 20.

Referring now to the valve housing 14, it will be seen that a cylindrical valve bore, generally designated 84, extends vertically upward within the housing 14. A pair of fluid passages 86 and 88 are also formed in the housing 14 and are adapted to respectively communicate the inner end of the bore 84 with the passage 22, and the fluid passageway 24 with an enlarged diameter lower section 84a of the bore 84, upon assembly of the housings 12 and 14. The bore 84 is formed with an intermediate diameter section 84b axially inward from the bore section 84a, and is further formed with a diameter section 84c which is inwardly adjacent to and slightly smaller than the bore section 84b. An elongated cylindrical bladder or sleeve valve 90, which is preferably fabricated of a resilient deformable material such as synthetic rubber or the like, coextends within the bore sections 84b and 84c and is operatively secured therein by a valve plug 92 which is threaded within and compresses an annular shoulder section 94 of the sleeve valve 90 within the valve bore section 84a. The valve plug 92 is formed with a reduced diameter stem section 96 that extends coaxially of the sleeve valve 90 and through which is formed a diametrically extending fluid passageway 98. Another fluid passageway 100 extends axially within the valve plug 92 and communicates the passageway 98 with another fluid passageway 102 which extends diametrically through a medical section of the plug 92. A spherical plug 104 is press fitted within and closes the outer end of the axial passageway 100. An annular recess 106 is formed around the outer periphery of the valve plug 92 in the same radial plane as the passageway 102 and functions to communicate the fluid passageway 88 formed in the valve housing 14 with the passageway 102.

Referring now to FIGURE 2, a pair of fluid outlet passages 108 and 110 extend transversely within the housing 12 and are communicable with the metering chambers 18 and 20, respectively. A fluid inlet passage 112 is similarly oriented within the valve housing 14 and is communicable with the bore section 84b of the valve bore 84. Suitable fluid inlet and outlet conduits (not shown) are attached to the housings 12 and 14 and are communicable with the fluid passages 108, 110 and 112 through a plurality of fluid conduit fittings 114, 116 and 118, respectively.

As illustrated in FIGURES 1 and 2, a plurality of bolts, generally designated 120, detachably secure the cover plate 16, together with a sealing gasket 122 which is preferably coextensive of the plate 16, to the side of the manifold housing 12, thereby closing the outer ends of the fluid passages 22 and 24. In a similar manner, a plurality of bolts 124 secure the valve housing 14 and a sealing gasket 126 to the opposite side of the manifold housing 12. It will be apparent, of course, that suitable openings are provided in gasket 126 such that the fluid passages 86, 22 and 88, 24 are communicable upon assembly of the housings 12 and 14.

In operation, the metering device 10 is connected through a suitable fluid conduit (not shown) to a fluid pumping device (also not shown), which is adapted to pump successive charges of fluid under pressure from a fluid reservoir into the inlet passage 112. As the pressurized fluid passes through the inlet passage 112 and into the valve bore section 84b, it deforms or collapses the sleeve valve 90, thereby sealing the fluid passageway 98 formed in the valve plug's stem section 96, as seen in FIGURE 3. With the sleeve valve 90 in this collapsed configuration, the pressurized fluid flows around the sleeve 90, upward through the valve bore 84 and into the fluid passages 86 and 22 from where it flows into the metering chambers 18 and 20. As the fluid passes into the chambers 18 and 20, the pistons 26 and 28 are forced downward thereby compressing the coil springs 82 and 83, respectively. Any fluid which is in the chambers 18 and 20 underneath the pistons 26 and 28 is therefore forced through the outlet passages 108 and 110 and into suitable conduits which communicate the fluid to its operative destination. The check valves 46 and 48 prevent any fluid which is beneath the pistons 26 or 28 from passing into the fluid passage 24 from where it might possibly return to the fluid reservoir of the pump.

When the pump reaches its suction cycle, the fluid pressure within the fluid passages 84, 22 and the metering chambers 18, 20 is immediately reduced, thus allowing the coil springs 82 and 83 to move the pistons 26 and 28 upwardly within the chambers 18 and 20. The fluid which is above the pistons 26 and 28, and within the passages 84 and 22, will accordingly begin to move back or out of these chambers and passages. Since this fluid is now under a slight pressure (due to the upward movement of the pistons 26 and 28), the sleeve valve 90 will be expanded to the position illustrated in FIGURE 4. In this expanded condition, the outer periphery of the sleeve valve 90 engages the periphery of the bore section 84c as seen at 128, thus preventing fluid from flowing out of the valve bore 84 through the inlet passage 112. With the sleeve valve 90 in its expanded position, the fluid flowing back through the passages 86, 22 and the valve bore 84, may then pass into the passageway 98, downward through the passageway 100, and into the transverse passageways 106 and 24. The fluid thus flowing into the passageway 24 unseats the check valves 46 and 48 and thereafter flows into the metering chambers 18 and 20 underneath the pistons 26 and 28. Upon completion of the pump's suction cycle, it will pump the next successive charge of fluid into the inlet passage 112, thereby effecting the next successive operational cycle of the metering device 10, as thus described.

It will be apparent that the quantity of fluid forced through the outlet passages 108 and 110 from the metering chambers 18 and 20 is equal to the displacement of the respective pistons 26 and 28, which displacements are in turn determined by the relative axial positions of the stem sections 78 and 80 of the adjustment rods 58 and 60 within the metering chambers 18 and 20. Thus, by adjusting the rods 58 and 60 axially downward within the chambers 18 and 20, the stroke of the pistons 26 and 28 will be reduced, thereby effecting a corresponding reduction in the displacement of the pistons 26 and 28, and thus a reduction in the quantity of fluid discharged or metered upon reciprocation thereof.

A particular feature of the aforegoing meter construction resides in the fact that the number of displacement bores or metering chambers within the manifold housing 12 may be widely varied. Alternately, several such manifold housings may be placed in series and each be effectively serviced by the single sleeve valve and valve plug assembly illustrated herein. Furthermore, each individual metering chamber may be adjusted to discharge a preselected quantity of fluid entirely independent of the other chambers within the manifold housing 12. Accordingly, the metering device 10 finds particular application in supplying preselected quantities of lubricating oil to various bearing surfaces of virtually any type of friction developing mechanical device. It will be seen that a multiplicity of such bearing surfaces or stations may be individually furnished with the exact quantity of oil required by using only a single metering device of the character disclosed herein. Moreover, the quantity of oil metered to any one particular station may be readily controlled independent of the other stations, as previously described. It will be noted, of course, that use of the metering device of the present invention is not limited to the above lubricating application.

While it will be apparent that the exemplary embodiment herein illustrated is well calculated to fulfill the objects stated, it will be appreciated that the metering device of the present invention is susceptible to modification, variation and change without departing from the proper scope or fair meaning of the subjoined claims.

What is claimed is:
1. In a metering valve,
a valve housing having fluid inlet and outlet passages,
said housing being formed with a plurality of fluid pumping chambers arranged in parallel,
a valve bore formed in said housing having valve means therein,
said valve means including a resilient sleeve and being adapted to selectively communicate said valve bore without said pumping chambers,
piston means reciprocable in each of said pumping chambers to pump fluid from said chamber to said fluid outlet passage, and
means in each of said chambers engageable with said piston means to limit the displacement thereof.
2. In a positive displacement adjustable metering device,
a meter housing having fluid inlet and outlet passages,
a valve bore formed in said housing,
a plurality of fluid displacement bores formed in said housing,
a fluid pressure responsive piston reciprocally mounted in each of said displacement bores,
a piston stop adjustably disposed in each of said displacement bores for independently controlling the displacement of each of said pistons,
first fluid passage means communicating said valve bore with said fluid inlet passage and with each of said displacement bores,
second fluid passage means communicating said valve bore with said fluid outlet passage and with each of said displacement bores,
a valve plug closing one end of said valve bore and communicating said second fluid passage means with said valve bore, and
a resilient deformable sleeve valve in said valve bore circumjacent said valve plug,
said sleeve valve being engageable with said valve plug to selectively communicate said valve bore with either said first or said second fluid passage means.
3. A metering device as set forth in claim 2 wherein said piston stops are threaded within said fluid displacement bores.

4. In a positive displacement adjustable metering device,
- a meter housing having fluid inlet and outlet passages formed therein,
- a valve bore in said housing communicable with said fluid inlet passage,
- a fluid displacement chamber communicable with said fluid outlet passage,
- piston means reciprocable within said chamber,
- means including an axially adjustable stop disposed within said chamber for limiting reciprocal movement of said piston,
- spring means within said chamber resiliently urging said piston means towards said stop,
- first fluid passage means communicating one end of said valve bore with said chamber on one side of said piston means,
- second fluid passage means communicating the opposite end of said valve bore with said chamber on the opposite side of said piston means,
- valve means within said chamber for preventing fluid flow from said chamber to said second fluid passage means, and
- valve means including a substantially hollow cylindrical valve plug disposed within said valve bore and a resilient annular sleeve interposed between the outer periphery of said plug and the inner periphery of said valve bore,
- said sleeve being movable in response to preselected fluid pressure within said valve bore to a position tightly engaging the outer periphery of said valve plug whereby said fluid inlet passage is communicable with said first fluid passage means, to a position tightly engaging the inner periphery of said valve bore whereby said first fluid passage means is communicable with said second fluid passage means.

5. In a fluid metering device, a meter housing having fluid inlet and outlet passages, a valve bore formed in said housing, a fluid metering bore formed in said housing, piston means reciprocable in said fluid metering bore, first and second fluid passage means communicating said valve bore with said fluid metering bore on the opposite sides of said piston means, valve means in said valve bore selectively communicating said valve bore with said first and said second fluid passage means, said valve means including a substantially hollow valve plug and a deformable resilient sleeve which is movable to and from a position tightly engaging the periphery of said valve bore and the outer periphery of said plug.

6. In a metering valve, a valve housing having fluid inlet and outlet passages, a plurality of fluid pumping chambers formed in said housing, piston means reciprocable in each of said chambers to pump fluid from the chambers to said fluid outlet passage, means in each pumping chamber engageable with the piston means in the chamber to limit said reciprocal movement thereof, a valve bore formed in said housing, and a fluid valve in said bore including a valve plug and a resilient deformable sleeve which is engageable with the outer periphery of said plug and the inner periphery of said bore to selectively communicate said fluid inlet passage with said pumping chambers.

7. In a metering device, a meter housing having fluid inlet and outlet passages, a valve bore in said housing communicable with said fluid inlet passage, a fluid displacement chamber within said housing communicable with said outlet passage, a piston means reciprocable within said chamber, first and second passage means communicating said valve bore with said chamber on the opposite sides of said piston, and valve means selectively communicating said valve bore with said first and second passage means, said valve means including a substantially hollow valve plug and a resilient annular sleeve circumjacent a portion of said plug.

8. In a metering device, a meter housing having fluid inlet and outlet passages, a valve bore in said housing communicable with said fluid inlet passage, a fluid displacement chamber within said housing communicable with said outlet passage, piston means reciprocable within said chamber, first and second passage means communicating said valve bore with said chamber on the opposite sides of said piston, and valve means selectively communicating said valve bore with said first and second passage means, and valve means in said second passage means for preventing fluid flow from said chamber to said valve bore.

References Cited by the Examiner

UNITED STATES PATENTS

| | | | |
|---|---|---|---|
| 1,699,494 | 1/1929 | Schmidt | 222—250 |
| 1,782,704 | 11/1930 | Woodruff | 222—249 |
| 1,959,501 | 5/1934 | Ross | 222—255 |
| 2,684,049 | 7/1954 | Hollis | 137—525 X |
| 2,826,342 | 3/1958 | Clark et al. | 222—250 X |
| 2,857,082 | 10/1958 | Perkins | 222—255 |
| 2,902,049 | 9/1959 | Ilfrey et al. | 137—525 X |
| 3,115,282 | 12/1963 | McKenzie | 222—380 X |

FOREIGN PATENTS 550,883   12/1957   Canada.

M. HENSON WOOD, JR., *Primary Examiner.*

LOUIS J. DEMBO, *Examiner.*

A. N. KNOWLES, *Assistant Examiner.*